United States Patent [19]

Groh

[11] Patent Number: 4,752,162
[45] Date of Patent: Jun. 21, 1988

[54] JIG FOR DRILLING DOWEL PIN HOLES

[76] Inventor: Edward F. Groh, 850 Hillside Rd., Naperville, Ill. 60540

[21] Appl. No.: 429,086

[22] Filed: Sep. 30, 1982

[51] Int. Cl.⁴ .................................................. B23B 41/00
[52] U.S. Cl. ............................. 408/115 R; 408/72 R; 33/638; 33/642
[58] Field of Search .................. 408/72 R, 72 B, 88, 408/97, 115 R, 115 B; 33/185, 189, 638, 642

[56] References Cited

U.S. PATENT DOCUMENTS

| | | | |
|---|---|---|---|
| 1,097,153 | 5/1914 | Wolgamood | 408/115 R |
| 2,367,582 | 1/1945 | Honyoust | 408/115 R |
| 2,466,023 | 4/1949 | Griffin | 408/115 R |
| 2,798,520 | 7/1957 | Maskulka et al. | 408/72 R |
| 2,836,087 | 5/1958 | Ehresmann | 408/115 R |
| 3,203,104 | 8/1965 | Heathington | 408/115 R |

FOREIGN PATENT DOCUMENTS

| | | | |
|---|---|---|---|
| 2240799 | 3/1975 | France | 408/115 R |
| 575360 | 2/1946 | United Kingdom | 408/72 R |

Primary Examiner—Gil Weidenfeld
Assistant Examiner—Daniel W. Howell
Attorney, Agent, or Firm—Charles F. Lind

[57] ABSTRACT

A jig is disclosed having a beam and a pair of L-shaped guide blocks mounted thereon, one block being rigidly secured thereto while the other block can be moved along the beam and then tightened thereon at any adjusted spacing from the fixed block. Each guide block has substantially parallel opposite side surfaces, and top and edge reference surfaces extended therebetween and disposed normal to one another to meet across an interior corner. In use, the top and edge reference surfaces of the jig are adapted to be butted flush against the top and edge surfaces of each respective board. The fixed guide block has a single drill guide opening and the slidable guide block has two parallel drill guide openings, each guide opening being formed through and normal to the guide block edge surface in a direction parallel to the side surfaces and to the top reference surface and being spaced from the top reference surface a single identical distance "t". The two drill guide openings in the sliding guide block are spaced apart a distance "s" and each of these openings and the drill guide opening in the fixed guide block is spaced from the respective adjacent side surface of the block a similar distance "d".

1 Claim, 3 Drawing Sheets

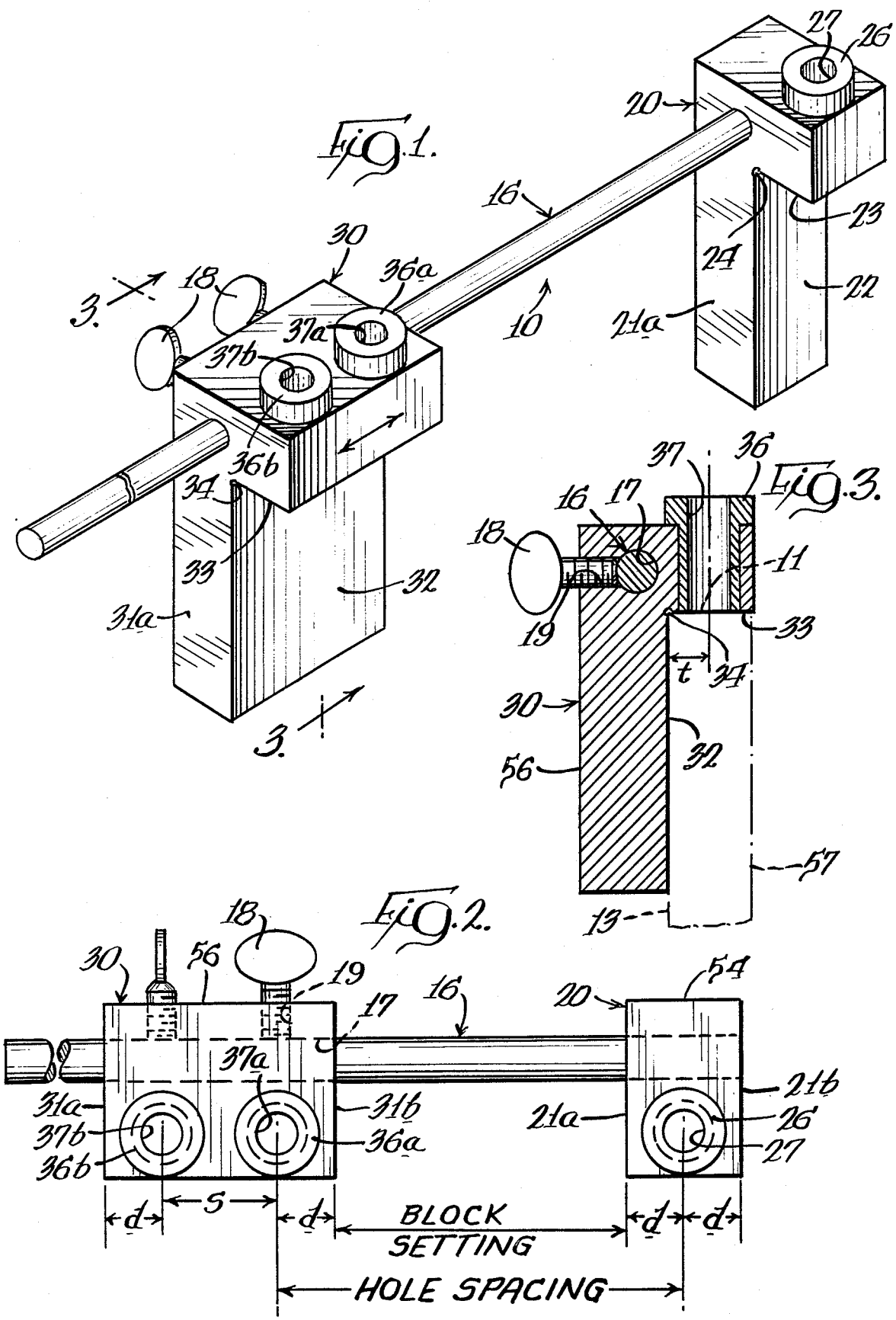

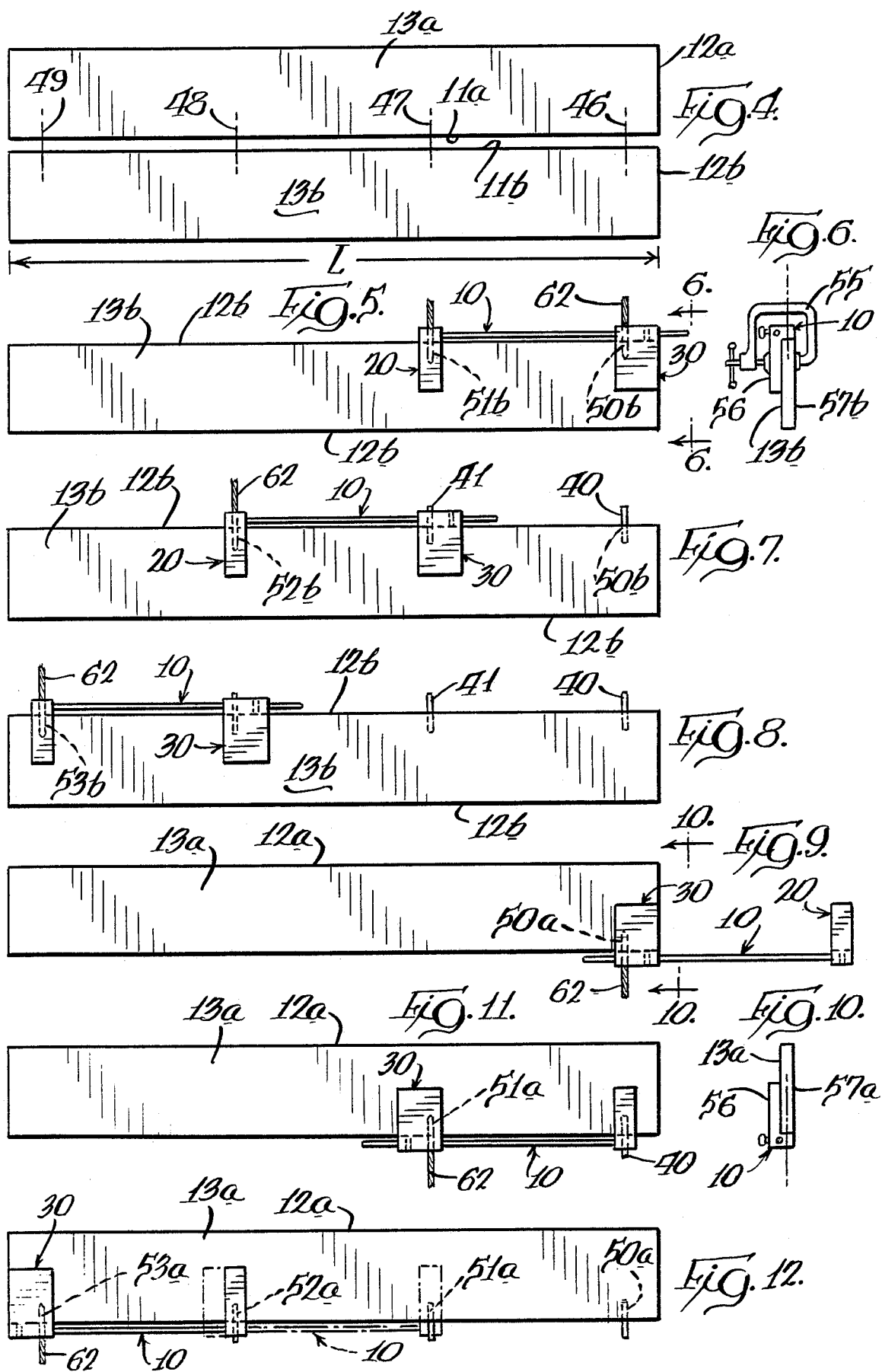

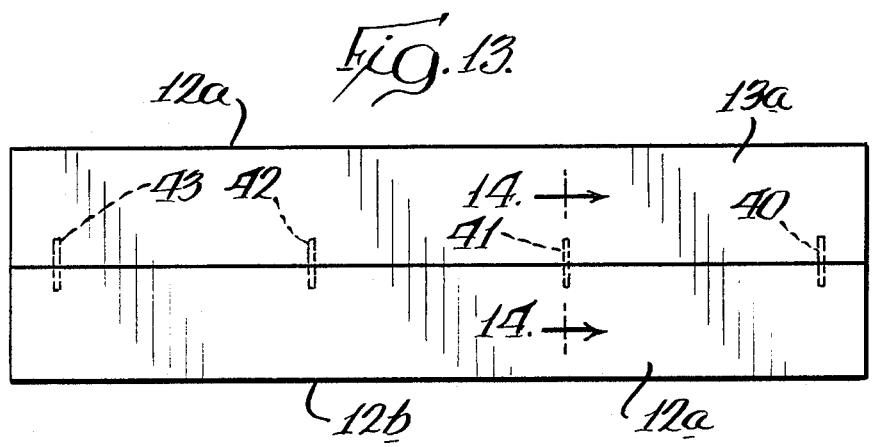
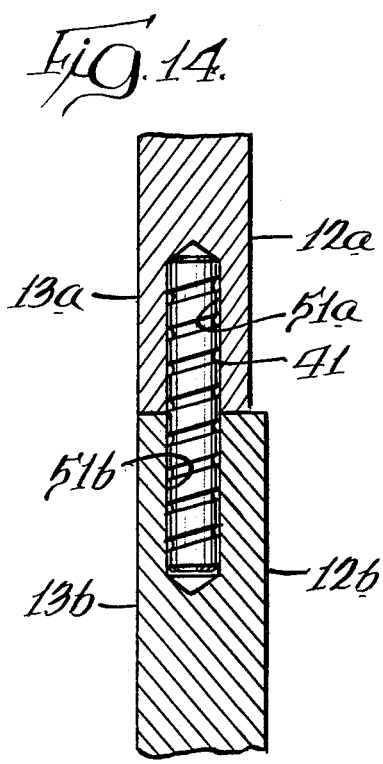
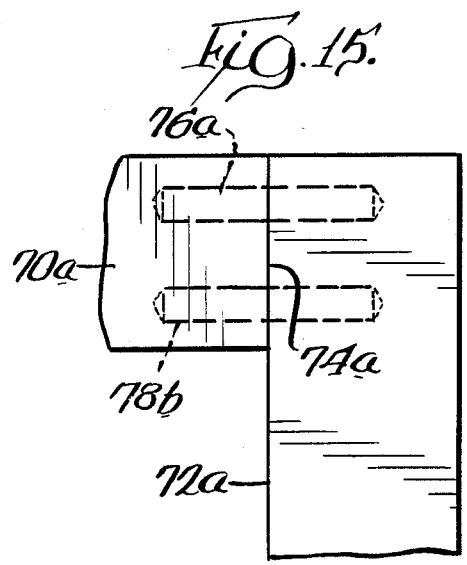
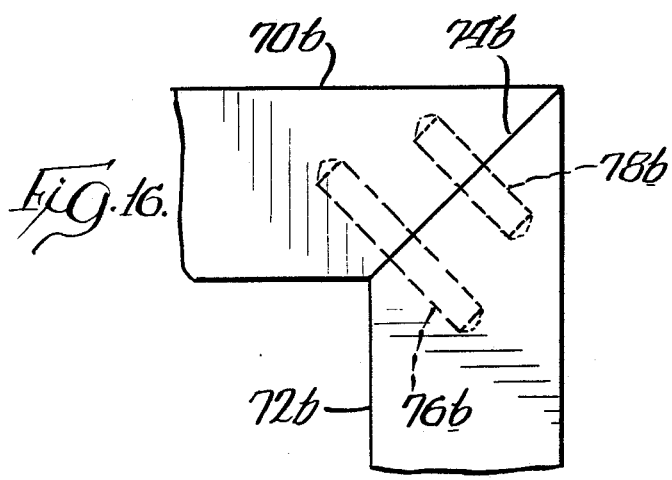

JIG FOR DRILLING DOWEL PIN HOLES

BACKGROUND OF THE INVENTION

In the fabrication of wooden table tops or the like, it is common to butt a plurality of adjacent boards edge-to-edge and fit or bond dowel pins in matched holes drilled in the edge surfaces to hold the top surfaces of the boards coplanar or flat. A common problem in such a fabrication, particularly by hobbyist-level woodworkers, is accurately locating and drilling the holes exactly opposite one another and in proper registry in the corresponding boards.

One aspect of registry is the placement of the dowel pins equally from the top surfaces of the boards so that when the boards are butted together the top surfaces are coplanar and flat. Of interest also in this registry is accurately sizing the holes and maintaining the holes parallel to the top surfaces of the boards. Moreover, the spacing between the many dowel pins used is important, ideally being somewhat uniformly spaced apart and somewhat symmetrical of the ends of the boards. Thus six dowel pins might be used to connect two 48 inch boards together. A dowel pin being located 1½ inches in from each edge and the remaining 45 inches might be divided into five equal spaces of 9 inches each.

One common source of problem is that the holes are reversed, in a mirror image or right and left hand fashion relative to one another, for each pair of adjacent boards to be butted together, so that different measuring techniques must be used for the separate boards. Another source of problem is that the boards may not be exactly of the same thickness or may be bowed slightly, so that misalignment, particularly at the top surface, can develop.

SUMMARY OF THE INVENTION

This invention relates to a jig for locating and drilling matched dowel pin holes accurately in the edge surfaces of two boards to be butted and/or connected together.

A particular object of this invention is to provide a jig that can be used with limited mental exercise by even a marginally skilled hobbyist for accurately locating and drilling matched dowel pin holes in two adjacent boards, where only minor jig adjustment is required to accommodate different center spacing and board length requirements.

Another object of this invention is to provide a jig that can be used to locate and drill holes in each of two boards so that they match up relative to one another, and provide when the dowel pins are positioned therein and the boards are secured together in the assembled condition, to maintain the upper surface of the boards coplanar or flat, even when bowed boards or boards of different thickness are used in the assembly.

BRIEF DESCRIPTION OF THE DRAWINGS

FIG. 1 is a perspective view of the subject jig or fixture;

FIG. 2 is a top plan view of the fixture as seen from FIG. 2 shown as it would be from an edge view looking into the board where the dowel pin holes are to be drilled in the line of sight;

FIG. 3 is an edge view in section as seen in line 3—3 showing the appropriate part of the fixture as well as showing its cooperation with a board as it would actually be used in drilling the dowel pin hole;

FIG. 4 is a top plan view at a different scale of a pair of boards of presupposed arbitrary length as well as where four dowel pin holes would be drilled for connecting the boards together at their edges;

FIG. 5 is a view of how the jig is used relative to the lower of the two boards in FIG. 4 for drilling the two right most holes in the board;

FIG. 6 is a view as seen generally from line 6—6 showing how a grip is used for holding the jig securely relative to the board for accurate drilling;

FIGS. 7 and 8 are views of the same board illustrated in FIG. 5, except showing the jig in different operative positions for drilling respectively the 3rd and 4th holes in from the right;

FIG. 9 is a view of how the jig is used relative to the upper of the two boards in FIG. 4 for drilling the right most hole in the board that will correspond to those previously drilled for example in FIGS. 5, 7 and 8 in the lower board;

FIG. 10 is an edge view as seen from line 10—10 in FIG. 9 showing how the jig is applied to the board;

FIGS. 11 and 12 are views correspondingly to FIG. 9, except showing the use of the jig in different operative positions thereon for drilling differing holes in the board;

FIG. 13 is a top plan view similar to FIG. 4, except showing the two boards butted together with the dowel pins positioned therein;

FIG. 14 is a sectional view at a larger scale of the dowel pin in place as seen from line 14—14 in FIG. 13; and FIGS. 15 and 16 are top plan views showing how corner joints can be formed and how between two frame members dowel pin holes can be located therein with the disclosed jig.

DETAILED DESCRIPTION OF THE INVENTION

FIGS. 1–3 show in detail a jig 10 for locating and drilling matched dowel pin holes in edge surfaces 11a, 11b (FIG. 4) of separate boards 12a, 12b each of substantially similar length, where the edge surfaces 11a, 11b are intended then to be butted together with the top surfaces 13a, 13b of the boards then aligned and coplanar. The jig 10 includes a beam 16 and a pair of L-shaped guide blocks 20, 30 mounted on the beam in a manner to be fastened tightly thereon at desired adjusted spacings therebetween. Specifically, block 20 is rigidly secured to the beam 16; while block 30 has a through bore 17 that slidably guides the block for movement along the beam, and thumb screws 18 threaded into taps 19 in the block can be tightened against the beam to hold block 30 at any adjusted spacing from block 20.

Each guide block 20, 30 has thereon substantially parallel opposite side surfaces 21a, 21b, 31a, 31b; and top reference surfaces 22, 32, and edge reference surfaces 23, 33 extended therebetween. The reference surfaces 22-23, 32-33 are disposed normal to one another to meet across an interior corner 24, 34 that is equally and laterally spaced from the beam 16, and is extended parallel thereto (see FIG. 3 for example). In use, the top and edge reference surfaces 22, 32 and 23, 33 respectively are adapted to be butted against the top 13 and edge 11 surfaces of the boards 12.

Guide block 20 has a single hole guide 26 defining a drill guide opening 27, and guide block 30 has two hole guides 36a, 36b defining two parallel drill guide openings 37a, 37b. Each drill guide opening 27, 37 is formed along an axis through and normal to the respective guide block edge surface 23, 33; and is extended parallel to the side surfaces 21, 31 and to top reference surface 22, 32 and is spaced from the top surface 22, 32 an identical distance "t" (see FIG. 3 for example). The two drill guide opening 37a, 37b in guide block 30 are spaced apart a distance "s" (see FIG. 2) and each of these openings and drill guide opening 27 in guide block 20 is spaced from the respective adjacent block side surface a similar distance "d".

Preferably, the guide blocks 20, 30 and beam 16 are formed of durable, dimensionally stable material, such as steel or aluminum. The drill guides 26, 36 are formed of very durable dimensionally stable material such as tool or hardened steel.

By way of example, each distance "d" might be one-half inch so that the guide block 20 between the two side surfaces 21a and 21b would be one inch wide. Also, the drill guide openings 37a, 37b in block 30 might be spaced one inch apart, so that guide block 30 might be two inches wide. The beam 16 further might be in excess of 20 inches but more normally would be closer to 10 or 15 inches. Depending on the size of the dowel pin ($\frac{1}{8}$, $\frac{1}{4}$ or $\frac{3}{8}$" are the standards), the spacing "t" would correspondingly be $\frac{1}{8}$, $\frac{1}{4}$ or $\frac{3}{8}$". Each drill guide hole 27, 37 would correspond to just slightly larger than the drill bit, and the drill bit would be exactly the same or slightly undersized relative to the size of the dowel pin.

FIG. 13 shows the boards 12a, 12b connected together with four dowel pins 40, 41, 42, 43 fitted in four correspondingly spaced and matched pairs of dowel pin holes 50, 51, 52, 53 (see FIGS. 5, 7-12) to be drilled along respective axis 46, 47, 48, 49 (see FIG. 4).

FIG. 14 shows how the dowel pin holes (51a, 51b specifically) are spaced equally from the top surfaces 13a, 13b of the boards 12a, 12b (although board 12b is shown thicker than board 12a), and how the dowel pin 41 fits within the dowel pin holes.

FIGS. 5 and 6 show how the jig 10 is located relative to the lower board 12b in order to drill the two holes 50b, 51b therein. Specifically, a C-clamp 55 is or can be used to fit against the back face 54, 56 on the guide blocks 20, 30 and against the underside 57 of the board in order to hold the top reference surface 22, 32 snug against the top surface 13b, with the edge reference surface 23, 33 firmed up against the edge surface 11 of the board 12b.

The "block setting" (as noted in FIG. 2) is the distance between the adjacent surfaces 21a, 31b of the two blocks 20, 30 in order to provide an adjusted "hole spacing" between the drill guide openings 27, 37b. With the four dowel pin example to be located in boards 12a, 12b of approximate length "L", the end dowel pins openings preferably should be only slightly and equally spaced from the opposite board ends and the remaining dowel pins should be equally spaced therebetween. Again by way of example, if the boards were of 24 inch length approximately and the guide blocks 20, 30 were dimensioned as previously noted, the proper "block setting" of the jig can be obtained as follows. Deduct from the board length "L" (24 inches) twice the distance "d" plus "s" between the remote side edge 31a of block 30 and the drill guide opening 37b. This dimension 2 (d+s), where "d" were one-half inch and "s" were one inch, would be three inches. This would thus leave 21 inches. This again need only be divided by the number of spaces (three) between the dowel pins to be used in the connection (or n−1, where "n" is the number of dowel pins to be used) to give the hole center line spacing of seven inches. However since it is always more accurate to measure between surfaces, than between hole centers, the distances "2d" between the holes centers 37a, 27 and the adjacent side edge surface 31b, 21a must be deducted, which as if "d" were one-half inch, would equal one inch. The "block setting" between the adjacent blocks surfaces 31b, 21a would thus be six inches.

In other words, $$\text{Block Setting} = \frac{L - 2(s + d)}{n - 1} - 1$$

or with the block size example $$\text{give} = \frac{L - 3}{n - 1} - 1.$$

Once this "block setting" distance is set, it is not adjusted or varied while drilling the dowel pin holes.

The manner of using and relocating the jig 10 at various operative positions relative to the board 10b in order to drill the holes therein is illustrated in FIGS. 5, 7 and 8. As noted the guide block 30 is positioned with its remote edge flush with the end edge of the board, and the top reference surfaces 32, 22 located flush against the top and edge surfaces 13b, 11 of the board 12b. The drill 62 shown schematically in FIG. 5 is then guided through the drill guide opening 37a, which sets the first hole 50 at a spacing of exactly (d+s) 1½ inches from the end edge of the board. The drill can also be located through the guide opening 27 of block 20 to drill the hole 51 in the board 12b. The C-clamp 55 is released and the jig 10 is refixtured, where a dowel pin 41 inserted in the dowel pin hole 51b can be positioned in turn within the drill guide hole 37a, whereat the guide block 20 can be clamped in place as seen in FIG. 7 and the drill 62 used to drill dowel pin hole 52b. The same procedure can be followed again where the jig 10 is moved and the guide block opening 37a is positioned over a dowel pin 42 fitted held in the dowel pin opening 52b in order to drill the last dowel pin opening 53b in the board 12b as illustrated in FIG. 8. This last dowel pin opening 53b will be spaced exactly one and one-half inches in from the end edge of the board 12b and if dimensions have been accurately maintained and board length was exactly 24 inches. However if there has been some minor error in measuring or inaccuracy in the original board length, this end spacing distance may be off slightly from exactly 1½ inches; but it is immaterial as the holes will nontheless match up relative to the opposite dowel pin holes as will be noted.

In order to drill the dowel pin holes in the board 12a jig 10 is flipped around end to end so that the beam and block 20 is cantilevered out from the end of the board as the guide block 30 is lined up at the end of the board. In this case however, the adjacent side surface 31b of the block is lined up flush with the end of the board and the drill 62 is guided through the guide opening 37b. This still gives the same edge spacing however. This flip-flop positioning of the jig is needed since the holes to be drilled will be in the opposite or right and left hand direction as noted relative to drilling in the board 12b.

The subsequent holes 51a, 52a and 53a are drilled with the same procedure used for drilling the holes in the board 12b, where the jig 10 is refixtured after each hole is drilled and the drill guide opening 27 of block 20 is positioned over the dowel pin located in the dowel pin opening just drilled. Thus, hole 51a is drilled (see FIG. 11) with the guide block opening 27 positioned over dowel pin 40 fitted in opening 50a; hole 52a is drilled (see FIG. 12) when guide block opening 27 is positioned over the dowel pin 41 fitted in dowel pin opening 51a; and opening 53a is drilled when guide block opening 27 is positioned over dowel pin 42 fitted in dowel pin opening 52a.

Note that the drill guide openings 27 in block 20 and 37a in block 30 are consistently used in drilling the dowel pin openings. The drill guide opening 32b is used only to drill the first dowel pin opening 50a (for example as shown in FIG. 9). At all other times this hole is not used, and accordingly can be plugged with a dowel pin to even further assist the person in drilling with little mental effort but yet in a virtual error proof manner.

Also, while the "block setting" is shown in FIG. 2 between the adjacent side surfaces 31b, 21a of the blocks 30, 20, it would be entirely possible to figure out the "hole spacing" between holes 27 and 37a based on a block setting between the outer surfaces 31a and 21b of the guide blocks.

FIGS. 15 and 16 illustrate two other practical uses for the dowel pin jig disclosed herein, namely where frame members 70, 72 are joined together such as might be employed in picture frames, cabinet work or the like. In such a situation, the top reference surface 32 of the guide block 30 is held against the top exposed face of each frame member 70, 72 and the edge reference surface 33 is held flush against the end or side edge of the board to be used to form the joint, with the jig being pointed in one direction relative to drilling in the one frame member and being pointed in the opposite direction for drilling in the other frame member, although the edge of the guide block is held flush relative to or from the same or corresponding reference surfaces on the boards. Thus, in FIG. 15, frame member 70a, 72a meet along butting edge 74a which is in line with the inside edge of the frame member 72a itself, and the end edge of frame member 70a abuts flush with this joint. Two dowel pins 76a, 78a are located in appropriately drilled holes therein in the respective end face of board 70a and the side face of board 72a. Again, the end edge of board 72a is used as a reference for the guide block edge to be flushed up to, as likewise the upper or outer edge surface on board 70a is used as the reference.

In FIG. 16 the butting joint 74b is located on a 45° angle and accordingly the dowel pins 76b and 78b are located on 45° angles relative to frame members 70b and 72b. The holes are drilled with the side surface of the guide block 30 being lined up flush with the same corresponding end edge of the frame member relative to the joint 74b.

What is claimed is:

1. A jig for locating and drilling matched dowel pin holes in the edge surfaces of separate boards each of substantially similar length "L", the boards intended then to be butted together with the top surfaces aligned and coplanar, comprising a beam and a pair of guide blocks mounted thereon, each of the blocks being L-shaped and having spaced parallel opposite side faces and edge and top reference surfaces disposed substantially normal thereto and normal to one another to meet across an interior corner, said reference surfaces being adapted upon manual manipulation of the jig to be positioned flush against the edge and top surfaces of the board, one of the blocks having a single drill guide hole and the other of the blocks having two parallel drill guide holes, each drill guide hole being equal in size and disposed on an axis substantially normal to the edge reference surface and parallel to the top reference surface and all of the drill guide holes being spaced from the top reference surface by an identical distance "t", the two drill guide holes in the other block being spaced apart by a known separation "s" in the direction of the top reference surface, and each drill guide hole further being spaced from the adjacent side face of the block a similar distance "d", means to mount the blocks on the beam, the first of the blocks being fixed to the beam and the second of the blocks being adapted to slide along on the beam to any adjustable block setting as measured between the adjacent side faces of the blocks and means to lock the second block to the beam at said setting, whereby the block setting is determined by subtracting from the measure board length "L" twice the known distance "s+d", dividing the remainder by "n−1" where "n" is the number of dowel pin holes to be drilled, and subtracting twice the distance "d", and whereby in use one side face of the other guide block is matched up flush with the end of the board and the first dowel pin hole is drilled through the second drill guide hole in from the flush edge, and through the drill guide hole in the one block if the same is also over the board, the jig is relocated and a dowel pin is inserted then into the drilled hole most remote from the board end and the next and each remaining hole is individually and sequentially drilled through either the drill guide hole in the one guide block or through the drill guide hole in the other guide block disposed adjacent the one guide block, with the location of the jig being determined by fitting at least one of the last two mentioned drill guide holes over a dowel pin inserted in the previously drilled hole.

* * * * *